(12) United States Patent
Erlacher et al.

(10) Patent No.: US 9,150,194 B2
(45) Date of Patent: Oct. 6, 2015

(54) METHOD FOR CONTROLLING A REVERSIBLE BELT TENSIONER OF A SAFETY BELT IN A MOTOR VEHICLE

(75) Inventors: Markus Erlacher, Hitzhofen (DE);
Michael Botsch, Ingolstadt (DE);
Christian Berger, Göteborg (SE);
Torsten Krüger, Ingolstadt (DE)

(73) Assignees: AUDI AG, Ingolstadt (DE);
AUTOMOTIVE SAFETY TECHNOLOGIES GMBH, Gaimersheim (DE)

( * ) Notice: Subject to any disclaimer, the term of this patent is extended or adjusted under 35 U.S.C. 154(b) by 0 days.

(21) Appl. No.: 14/130,410

(22) PCT Filed: Jun. 18, 2012

(86) PCT No.: PCT/EP2012/002563
§ 371 (c)(1),
(2), (4) Date: Apr. 7, 2014

(87) PCT Pub. No.: WO2013/004342
PCT Pub. Date: Jan. 10, 2013

(65) Prior Publication Data
US 2014/0263800 A1 Sep. 18, 2014

(30) Foreign Application Priority Data
Jul. 1, 2011 (DE) .......... 10 2011 106 247

(51) Int. Cl.
*B60R 22/00* (2006.01)
*B60R 22/35* (2006.01)
(Continued)

(52) U.S. Cl.
CPC .............. *B60R 22/35* (2013.01); *B60R 21/013* (2013.01); *B60R 21/0132* (2013.01); *B60R 21/0134* (2013.01); *B60R 2021/01272* (2013.01)

(58) Field of Classification Search
USPC .......... 280/801.1, 806, 807; 180/268; 701/45, 701/46
See application file for complete search history.

(56) References Cited

U.S. PATENT DOCUMENTS 6,873,892 B2   3/2005   Katz et al.
7,072,753 B2   7/2006   Eberle et al.
(Continued)

FOREIGN PATENT DOCUMENTS

DE   100 22 434   11/2001
DE   101 03 401   8/2002
(Continued)

OTHER PUBLICATIONS

International Search Report issued by the European Patent Office in International Application PCT/EP2012/002563 on Sep. 18, 2012.
(Continued)

Primary Examiner — Faye M Fleming
(74) Attorney, Agent, or Firm — Henry M. Feiereisen LLC

(57) ABSTRACT

A method for controlling a reversible belt tensioner of a safety belt in a motor vehicle includes detecting a time profile of at least one state variable and/or at least one variable relating to the surroundings of the motor vehicle, identifying a predetermined driving maneuver and/or a value characterizing the attentiveness of a driver from the time profile of the at least one detected state variable and/or variable relating to the surroundings, and controlling the reversible belt tensioner based on the identified driving maneuver or on the basis of the value characterizing the attentiveness of the driver.

8 Claims, 2 Drawing Sheets

(51) Int. Cl.
*B60R 21/013* (2006.01)
*B60R 21/0132* (2006.01)
*B60R 21/0134* (2006.01)
*B60R 21/01* (2006.01)

(56) References Cited

U.S. PATENT DOCUMENTS

| | | | |
|---|---|---|---|
| 7,144,043 | B2 | 12/2006 | Viernekes |
| 7,798,275 | B2 | 9/2010 | Fehring et al. |
| 8,146,703 | B2 | 4/2012 | Baumann et al. |
| 8,335,614 | B2 | 12/2012 | Bauer et al. |
| 8,775,030 | B2 * | 7/2014 | Mages ............... 701/45 |
| 2006/0041381 | A1 * | 2/2006 | Simon et al. ............ 701/301 |
| 2006/0145463 | A1 | 7/2006 | Isaji et al. |
| 2007/0100525 | A1 | 5/2007 | Mattes et al. |
| 2008/0238075 | A1 * | 10/2008 | Bullinger et al. ......... 280/806 |
| 2009/0138159 | A1 | 5/2009 | Ewerhart et al. |
| 2013/0073149 | A1 * | 3/2013 | Schoerrig .............. 701/45 |

FOREIGN PATENT DOCUMENTS

| | | |
|---|---|---|
| DE | 102 02 047 | 7/2003 |
| DE | 102 12 985 | 10/2003 |
| DE | 102 35 160 | 2/2004 |
| DE | 103 24 215 | 12/2004 |
| DE | 103 25 163 | 12/2004 |
| DE | 103 26 358 | 12/2004 |
| DE | 102004027085 | 12/2005 |
| DE | 102004057603 | 4/2006 |
| DE | 102004057604 | 6/2006 |
| DE | 102004062084 | 6/2006 |
| DE | 102005010997 | 9/2006 |
| DE | 102005022678 | 11/2006 |
| DE | 102005035849 | 2/2007 |
| DE | 102005035850 | 2/2007 |
| DE | 102005035862 | 2/2007 |
| DE | 102005035863 | 2/2007 |
| DE | 102005038226 | 2/2007 |
| DE | 102006002499 | 7/2007 |
| DE | 102006045454 | 4/2008 |
| DE | 102006051786 | 4/2008 |
| DE | 102006051787 | 5/2008 |
| DE | 102007002704 | 7/2008 |
| DE | 102007009335 | 8/2008 |
| DE | 102007015187 | 10/2008 |
| DE | 102008007149 | 10/2008 |
| DE | 102008042342 | 4/2010 |
| DE | 102008050316 | 5/2010 |
| DE | 102009011580 | 9/2010 |
| DE | 102009049195 | 4/2011 |
| EP | 1 747 943 | 1/2007 |
| WO | WO 2011/006262 | 1/2011 |

OTHER PUBLICATIONS

Copy of Chinese Search Report issued by the Chinese Patent Office in counterpart Chinese Application No. 2012800329094 on Jun. 3, 2015.

English translation of Chinese Search Report issued by the Chinese Patent Office in counterpart Chinese Application No. 2012800329094 on Jun. 3, 2015.

* cited by examiner

US 9,150,194 B2

METHOD FOR CONTROLLING A REVERSIBLE BELT TENSIONER OF A SAFETY BELT IN A MOTOR VEHICLE

CROSS-REFERENCES TO RELATED APPLICATIONS

This application is the U.S. National Stage of International Application No. PCT/EP2012/002563, filed Jun. 18, 2012, which designated the United States and has been published as International Publication No. WO 2013/004342 and which claims the priority of German Patent Application, Serial No. 10 2011 106 247.9, filed Jul. 1, 2011, pursuant to 35 U.S.C. 119(a)-(d).

BACKGROUND OF THE INVENTION

The present invention relates to a method for controlling a reversible belt tensioner of a safety belt in a motor vehicle. In addition, the present invention relates to a driver assistance system for a motor vehicle. Finally, the present invention relates to such a vehicle.

Today's vehicles are equipped with a conventional belt system without a reversible belt tensioner or with a belt system with a reversible belt tensioner. For motor vehicles that are equipped with reversible belt tensioners, the safety belt is tightened at the beginning of a trip when the belt is inserted and the so-called belt slack is removed. However, slack can be introduced again into the respective safety belt system during the trip by movement of the driver or of the passenger or as a result of a driving maneuver. The safety belt is then no longer sufficiently tightened and the safety of the driver or of the other vehicle occupants is no longer fully guaranteed.

DE 10 2005 035 850 A1 relates to a method for controlling a reversible belt tensioner in a motor vehicle, wherein the time profile of a measured value characterizing the vehicle dynamics is determined and a gradient of this measured value is calculated. The belt tensioner is activated when the gradient of the measured value exceeds a predetermined threshold value.

DE 10 2005 035 863 A1 describes a method for controlling a reversible belt tensioner in a motor vehicle. In this case, the belt tensioner is activated, so that a safety belt is brought from a normal position to a second position wherein the belt is tightened more than in the normal position. The belt tensioner is here activated independent of any dangerous situation.

DE 10 2008 050 316 A1 discloses a method for dynamically securing a vehicle occupant strapped in a seat of the vehicle with a safety belt. Here, a transverse dynamics of the vehicle is determined by at least one sensor. A slack of the safety belt is then at least partially rolled up by a safety belt retractor, when an upper threshold value of the transverse dynamics is exceeded, and a radius of curvature of a road course ahead remains constant or decreases.

DE 10 2008 007 149 A1 describes a method for generating, controlling and triggering a warning signal in a motor vehicle. Here, an attentiveness measure of the driver is determined by analyzing the driver's eye blink. A corresponding warning signal is outputted, for example by activation of the belt tensioner, in response to the attentiveness.

Lastly, systems are used in modern motor vehicles, wherein the field of vision of the driver is monitored by a camera. For example, when the driver turns his eyes away from the road and the driver assistance system recognizes a corresponding obstacle on the road, the driver is warned visually or audibly. However, the installation of such systems results in additional costs.

SUMMARY OF THE INVENTION

It is the object of the present invention to provide a method for controlling a reversible belt tensioner of the aforementioned type which allows a safer and more effective control of a belt tensioner of a safety belt in a motor vehicle. In addition, a corresponding driver assistance system is to be provided.

This object is attained according to the invention by a method for controlling a reversible belt tensioner of a safety belt in a motor vehicle by detecting a time profile of at least one state variable and/or at least one environment variable of a motor vehicle, detecting a predetermined driving maneuver and/or a value characterizing the attentiveness of a driver based on the time profile of the at least one detected state variable and/or environment variable, and controlling the reversible belt tensioner in response to the detected driving maneuver or in response to the detected value that characterizes the driver's attentiveness.

A previously determined driving maneuver performed by the driver is detected based on the time profile of a state variable and/or an environment variable. "State variable" is to be understood in the following as the speed, the acceleration, the transverse acceleration, the yaw rate, the direction of travel and the like. "Environment variable" refers preferably to those variables that are captured with forward-looking environment sensors. Examples include the course of the road, the distance from an obstacle or from other vehicles or the detection of the corresponding road markings or traffic signs. A previously determined driving maneuver is detected based on the time profile of these variables and the reversible belt tensioner is controlled in response to the detected maneuver. The reversible belt tensioner can thus be controlled based on the respective driving maneuver so as to guarantee the maximum safety for the driver or the other passengers. The point in time may also be determined based on the respective driving maneuver when the reversible belt tensioner is controlled and consequently the safety belt is tightened.

Based on the time profile of the at least one state variable and/or environment variable of the motor vehicle, a value characterizing the driver's attentiveness can also be determined. This value can also be used to make a statement about the driver's fatigue. It can be determined, for example, from the state variables of the motor vehicle at which time intervals driving commands are given by the driver. It can also be determined from the state variables and/or from the environment variables, how quickly the driver reacts to an environment of the automobile. The attentiveness of the driver can be deduced from these quantities, whereby the driver per se does not have to be monitored, for example by using suitable optical systems; moreover, existing sensors installed inside the vehicle can be used. A plurality of attentiveness levels of the driver may be set based on the detected state variables and/or environment variables. The belt tensioner can be controlled accordingly as a function of the attentiveness of the driver.

In one embodiment, the predetermined driving maneuver is an evasive maneuver and the belt tensioner is controlled during the evasive maneuver and/or after the evasive maneuver to tighten the safety belt. "Evasive action" is to be understood as a driving maneuver, wherein the driver deviates from the previously determined lane or direction of travel, for example, to avoid an obstacle. Such evasive maneuver is performed, for example, to test the driving dynamics of a motor vehicle and is known under the name of Lane Change Test or "Elk Test". In such an evasive maneuver, the driver performs suitable steering movements, whereby slack is introduced in the safety belt by the typically hectic movements from the driver. Such an evasive maneuver represents a critical situation for the driver where he needs special protection. There is also a non-negligible risk immediately after the evasive maneuver that the driver loses control of the vehicle. This loss of control can cause an accident. By detecting the evasive maneuver, the belt tensioner can be activated already during and/or preferably after the evasive maneuver and the safety belt can be tensioned. The safety belt is thus in perfect contact with the body of the driver after the evasive maneuver. The driver is hence optimally prepared in the event of an impending accident and the protective potential of the belt is fully exploited.

According to another embodiment, the predetermined driving maneuver is a transition from reverse travel to forward travel and the belt tensioner is controlled at a start of the forward travel for tightening the safety belt. While travelling in reverse, the driver does not only rely on the existing side-view and rear-view mirrors and on existing audio or visual warning systems, but usually turns his upper body toward the passenger seat to get a better view through the rear window. If the driver wears a safety belt, this movement by the driver produces slack in the safety belt. After reverse travel is completed and when forward travel is resumed, the safety belt may then not be sufficiently tightened. The reversible belt tensioner is therefore controlled accordingly when starting the forward travel so that the safety belt is tightened. The conditioning of the driver in the driver's seat is thereby improved and passive safety systems can become more effective in a dangerous situation.

In another embodiment, the predetermined driving maneuver is cornering, wherein at least one predefined threshold value for the state variable and/or the environment variable is exceeded while cornering, and the belt tensioner is controlled before and/or while driving through curves to tighten the safety belt. There is an increased risk of accidents with dynamic cornering, because for example an excessive speed can lead to oversteering or understeering of the vehicle depending on the vehicle design. To be able to take advantage of the full protective potential of the belt system, slack is gently removed from the belt system by the reversible belt tensioner before negotiating a curve. Optionally, the set tightness of the safety belt is thereafter maintained until the curve has been negotiated or the speed of the motor vehicle has been adjusted back to the road conditions. The safety belt is in ideal contact with the body of the driver or the other passengers during cornering. In this way, all vehicle occupants are ideally protected by the belt system in the event of a possible accident. For example, a predicative route of the road may be detected with appropriate look-ahead environment sensors and compared with the state variables of the motor vehicle. It can then be determined before negotiating a curve, whether the speed of the motor vehicle is too high for driving through the curve. It can also be detected whether the motor vehicle leaves the assigned lane. In this case, the safety belt can be tightened by the reversible belt tensioner by applying a large force.

In another embodiment, the predetermined driving maneuver is an approach to an intersection wherein a predetermined threshold value for the state variable and/or the environment variable is exceeded for such an approach to an intersection, and the belt tensioner is controlled so as to tighten the safety belt before and/or during the intersection is crossed. Likewise, there is an increased risk of an accident when the motor vehicle is moving into an intersection at an excessive speed. In such a case, there is a risk of a collision with an obstacle or with another vehicle. Likewise, such an approach to an intersection may cause a sudden evasive maneuver by the driver. Here, the course of the road or the presence of an intersection may be detected with look-ahead environment sensors, and it may be determined based on the detected state variables, whether these state variables exceed a predetermined threshold value for the present intersection. Thus, the reversible belt tensioners of the motor vehicle can already be controlled before entering the intersection, and the safety belt can be tightened accordingly. The tightness of the safety belt is preferably maintained until the intersection is safely crossed or the speed of the vehicle has been reduced.

Preferably, the driver is warned as soon the value characterizing the driver's attentiveness exceeds or falls below a predetermined threshold value by tightening the safety belt through control of the belt tensioner. A value characterizing the driver's attentiveness can be determined from the time profile of the state variables and/or the environment variables of the motor vehicle. This value can also be used to determine the driver's fatigue. When this value exceeds or falls below a predetermined threshold value, the reversible belt tensioner can be activated accordingly so as to tighten the safety belt. The driver can then be warned by the activation of the reversible belt tensioner, thereby increasing the driver's attentiveness.

This warning operates directly on the body of the driver and can therefore be perceived by the driver more immediately and more quickly than corresponding alerts generated, for example, by an audible or visual signal. In particular, the driver can be particularly effectively warned by the tightening of the belt when the driver is at risk of falling asleep, has already fallen asleep or is at risk of falling asleep again. Different escalating levels of attentiveness or fatigue of the driver may also be determined based on the detected state and/or environment variables, which can then be used to control a selectable alarm profile. For example, different jerk profiles may be generated by tightening the safety belt. This reduces the period of inattentiveness by the driver, thus allowing the driver to more quickly resume control of the motor vehicle. This therefore also reduces the danger for the surrounding traffic and the driver himself. If the driver's attentiveness can not be sufficiently restored by the warning function, then all reversible belt tensioners may be permanently controlled so as to safely prepare all vehicle occupants for a possible accident. Suitable sensors which are normally present in the vehicle can be used with this warning function. For example, additional cameras are then not required to monitor the eye blink or the driver's viewing direction. Accordingly, there are no additional costs.

Preferably, the at least one state variable is determined based on at least a wheel rotation speed, a position of a brake pedal, a position of an accelerator pedal, a position of a clutch pedal, a steering wheel angle and/or an engaged gear. The respective sensors for determining these parameters of the motor vehicle are usually already present in the motor vehicle. Likewise, the state variables may be determined, for example, from the engine controller and/or the brake controller. The existing systems can therefore be used and there are no additional costs.

Preferably, the at least one environment variable is determined based on a course of the road detected by a camera and/or based on data of the course of the road obtained from a navigation system. Look-ahead environment sensors are usually already present in motor vehicles and therefore need not be additionally upgraded. Alternatively or in addition to a camera, other environment sensors, such as optical sensors, radar sensors and/or lidar sensors, may be used.

Furthermore, according to the invention, a driver assistance system for a motor vehicle is provided, with
a sensor for detecting a time profile of at least one state variable and/or an environment variable of the motor vehicle,
a reversible belt tensioner for a safety belt, and
a controller which is configured to detect based on the time profile of the at least one detected state variable and/or environment variable a predetermined driving maneuver and/or a value characterizing the attentiveness of a driver, and to activate the reversible belt tensioner in response to the detected driving maneuver or the detected value characterizing the attentiveness of the driver.

Lastly, according to the invention, a motor vehicle with a driver assistance system described above is provided. The embodiments described with reference to the method of the invention can be applied commensurately to the driver assistance system according to the invention and to the motor vehicle according to the invention.

BRIEF DESCRIPTION OF THE DRAWING

The present invention will now be explained in more detail with reference to the appended drawings. These show in.

DETAILED DESCRIPTION OF PREFERRED EMBODIMENTS

The embodiments illustrated in greater detail below represent preferred embodiments of the present invention.

Figure 1:
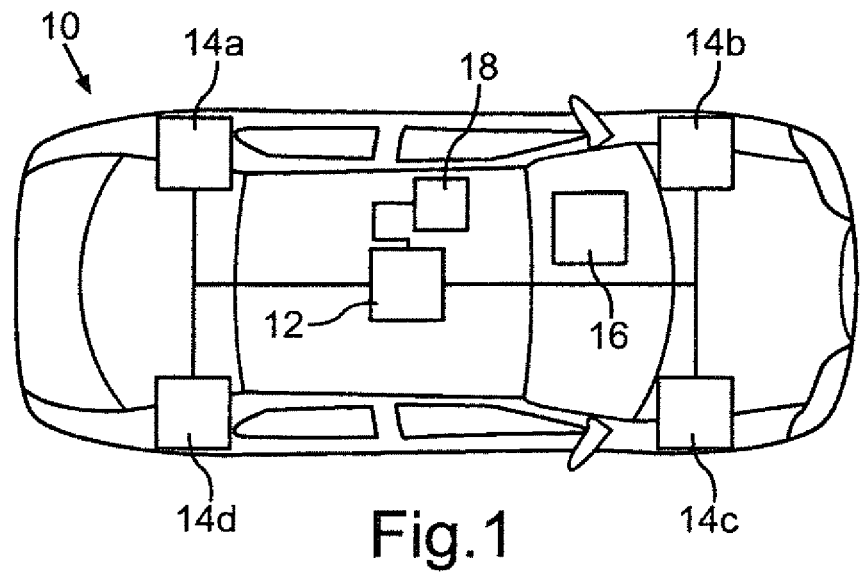
FIG. 1 a motor vehicle having suitable sensors for detecting state variables of the vehicle and a controller, FIG. 2 a motor vehicle having suitable sensors for detecting environment variables of the motor vehicle and a controller, and FIG. 3 a motor vehicle having state and environment sensors, which can be used to determine the future position of the motor vehicle.

FIG. 1 shows a motor vehicle 10 having a controller 12. The controller 12 is connected via corresponding data lines to the wheel rotation speed sensors 14a to 14d of the wheels of the motor vehicle. Furthermore, the controller 12 is connected with a steering angle sensor 16, which is operatively connected with the steering system of the motor vehicle. The controller 12 is configured to determine at least one state variable of the vehicle 10 based on the data of the wheel rotation speed sensors 14a to 14d and based on the data of the steering angle sensor 16. Such state variable may be, for example, the speed, the acceleration, the direction of travel and the like. The motor vehicle may have additional (unillustrated) sensors configured to determine other state variables of the motor vehicle 10.

In addition, the controller 12 is configured to identify a predetermined driving maneuver based on the time profile of the state variables. A belt tensioner 18 can be activated accordingly in response to this driving maneuver so as to tighten a safety belt. Such predetermined driving maneuver may be an evasive maneuver, wherein the belt tensioner 18 is controlled during the evasive maneuver and/or after the evasive maneuver to tighten the safety belt. Another driving maneuver may be the transition from reverse travel to forward travel, wherein the belt tensioner 18 is controlled at a start of forward travel, so that the safety belt is tightened accordingly. During the aforementioned driving maneuvers, slack is introduced into the belt system by movement of the driver. Usually, the belt tensioners 18 are controlled for all occupants in the motor vehicle.

Figure 2:
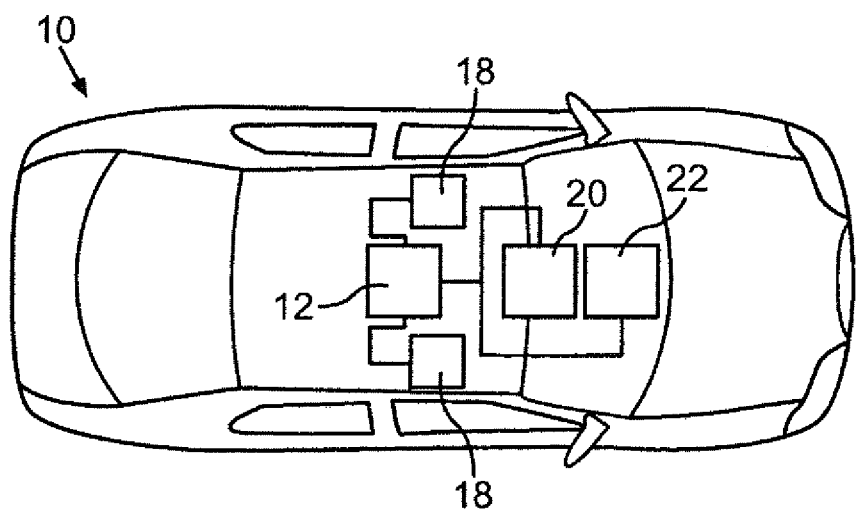

FIG. 2 shows another embodiment of a motor vehicle 10, which likewise has a controller 12. In addition, the motor vehicle 10 includes a camera 20 and a navigation system 22. The controller 12 is in this example coupled with two belt tensioners 18. Corresponding environment data of the motor vehicle 10 can be detected with the camera 20 and/or the navigation system 22. Other types of optical sensors or other forward-looking environment sensors, such as radar sensors and/or lidar sensors can be used instead of the camera 20. The controller 12 is configured to determine the time profile of at least one environment variable of the motor vehicle 10 from the data of the camera 20 and of the navigation system 22. Based on the time profile of the environment variable, a predetermined driving maneuver performed by the driver of the motor vehicle 10 can be determined. Such a driving maneuver may, for example, involve cornering, wherein at least one predetermined threshold value for the environment variable for cornering is exceeded. Such driving maneuver may also be an approach of an intersection, wherein at least one predetermined threshold value for the environment variable for such an approach of an intersection is exceeded.

A corresponding environment sensor or the camera 20 of the motor vehicle 10 continuously detects the travel lane. Corresponding curves, intersections and/or distances to other vehicles or to obstacles are reported to the controller 12. The controller 12 then already controls the belt tensioners 18 before the corresponding driving maneuver, for example dynamic cornering or when an intersection is approached at excessive speed. The belt tensioner 18 is hereby controlled before and preferably during the respective driving maneuver. The safety belt preferably remains tensioned until the driving maneuver has been performed or until the speed of the motor vehicle has been adjusted accordingly.

The navigation system 22 can also continuously send a predicative course of the route to the controller. An artificial horizon is hereby produced in the controller 12, from which the controller 12 can determine corresponding curves, intersections, or distances to other vehicles or obstacles. Here too, the belt tensioner(s) 18 can already be controlled in advance by the controller 12 so as to tighten the safety belt.

Figure 3:
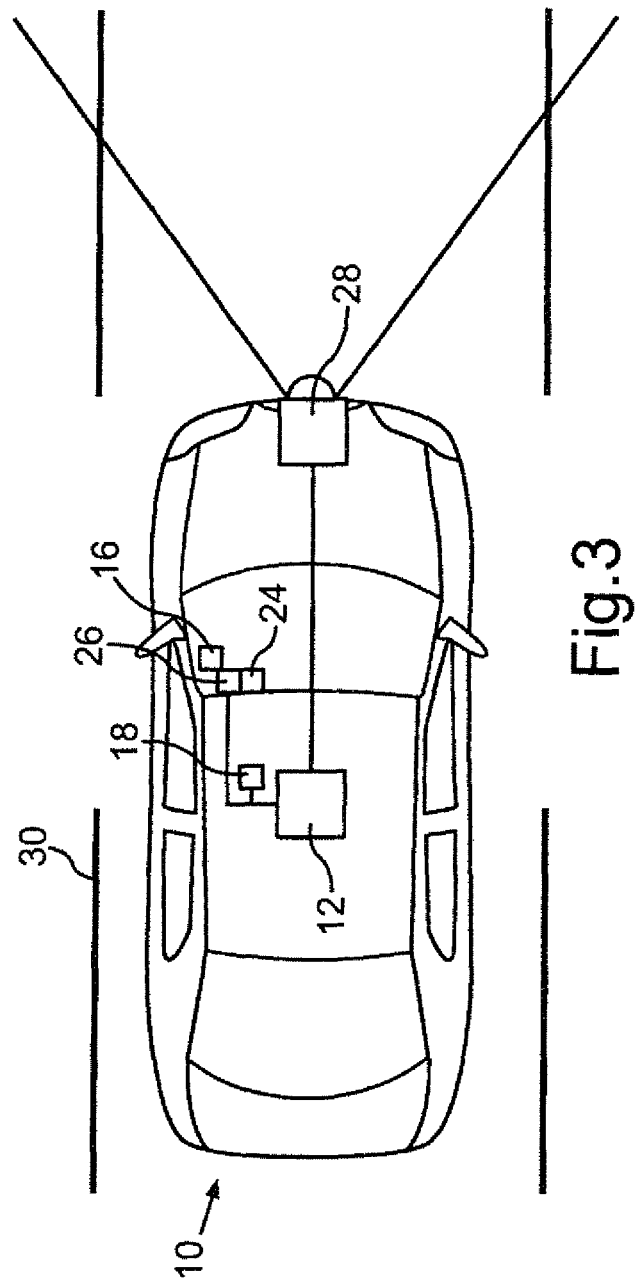

FIG. 3 shows a motor vehicle 10 which likewise has a corresponding controller 12. The controller 12 can be used to determine corresponding state variables and/or environment variables of the motor vehicle 10. For this purpose, the motor vehicle includes suitable sensors 10, as previously described for example in conjunction with FIG. 1 and FIG. 2. Alternatively or in addition to the sensors described in FIGS. 1 and 2, the position of an accelerator pedal, the position and change in the position of a brake pedal and/or a possible operation of a clutch pedal can be detected. For example, the accelerator pedal position can be detected by an engine controller 24 which is connected to the controller 12. Likewise, the position or change in the position of a brake pedal may be detected by a brake controller 26 which is also connected to the controller 12. In addition, as previously described in conjunction with FIG. 1, the operation of the steering system or the change of the steering angle is detected. Furthermore, the operation of corresponding man-machine interfaces operated by the driver may be taken into consideration.

A value characterizing the driver's attentiveness can be determined from the detected variables, in particular from the time profile of the measured state and/or environment variables. Other features indicative of an increased inattentiveness of the driver can be derived, for example, from an open side window, from a blower running at high speed and/or from a low temperature and a high sound level in the passenger compartment of the motor vehicle. A continuous driver model providing information about the driver activity is calculated from the above data. In this way, a single-stage driver model estimator can be determined. It is also feasible to expand this driver model estimator to a multi-stage estimator by using the data from a potentially available lane departure warning and an object recognition system 28. For this purpose, the data from the lane departure warning are compared with the position of the vehicle within lane markers 30, and a predictive travel direction is calculated by taking into account the turn signal lever and compared with the current and future direction of travel. When data from an object-based environment sensor system are also considered, the driver's reaction time in relation to vehicles driving in front as a function of the selected operating mode (e.g., car, dynamic or comfort) also enter the attentiveness model.

If the continuously calculated driver model leads to the conclusion that the driver is increasingly inattentive or fatigued, then the controller 12 activates the reversible belt tensioner 18 and thus noticeably tightens the safety belt. Different warning levels can be provided to warn the driver by a corresponding jerk on the safety belt. Because the safety belt is in direct contact with the body of the driver, the driver can immediately notice the warning, thereby enhancing his attentiveness. Additional controllable actuators may also be provided in the vehicle which can be used to generate an audible and/or visual warning or a haptic warning, such as a vibration of the steering wheel. Also, for example, a suitable intervention in the braking system can be performed, which causes a corresponding jerk.

A predetermined driving maneuver and/or a value characterizing the attentiveness of a driver can also be determined with a combination of the sensors shown in FIGS. 1 to 3 for detecting state variables and/or environment variables of the motor vehicle.

The invention claimed is:

1. A method for controlling a reversible belt tensioner of a safety belt in a motor vehicle, comprising:
   detecting a time profile of at least one state variable,
   detecting, based on the time profile of the at least one detected state variable, a predetermined driving maneuver comprising a transition from reverse travel to forward travel, and
   controlling the reversible belt tensioner at a start of the forward travel following the transition from reverse travel so as to tighten the safety belt.

2. The method of claim 1, further comprising:
   detecting a time profile of at least one environment variable of the motor vehicle, and
   detecting the predetermined driving maneuver additionally based on the time profile of the at least one environment variable.

3. The method of claim 2, further comprising:
   detecting, based on the time profile of the at least one detected state variable or based on the time profile of the at least one environment variable, a value characterizing an attentiveness of a driver, and
   controlling the reversible belt tensioner based on the value characterizing the attentiveness of the driver.

4. The method of claim 3, wherein the reversible belt tensioner is controlled as soon as the value characterizing the driver's attentiveness exceeds or falls below a predetermined threshold for warning the driver.

5. The method of claim 1, wherein the at least one state variable is determined based on at least one of a wheel rotation speed, a position of a brake pedal, a position of an accelerator pedal, a position of a clutch pedal, a steering wheel angle and an engaged gear.

6. The method of claim 2, wherein the at least one environment variable is determined based on a course of the road detected by a camera or based on data of the course of the road obtained from a navigation system.

7. A driver assistance system for a motor vehicle, the driver assistance system comprising:
   a sensor configured to detect a time profile of at least one state variable of the motor vehicle,
   a reversible belt tensioner for a safety belt, and
   a controller configured to detect, based on the time profile of the at least one state variable, a predetermined driving maneuver comprising a transition from reverse travel to forward travel and to control the reversible belt tensioner at a start of the forward travel following the transition from reverse travel so as to tighten the safety belt.

8. A motor vehicle comprising a driver assistance system, wherein the driver assistance system comprises:
   a sensor configured to detect a time profile of at least one state variable of the motor vehicle,
   a reversible belt tensioner for a safety belt, and
   a controller configured to detect, based on the time profile of the at least one state variable, a predetermined driving maneuver comprising a transition from reverse travel to forward travel and to control the reversible belt tensioner at a start of the forward travel following the transition from reverse travel so as to tighten the safety belt.

* * * * *